US012014357B2

United States Patent
Rule et al.

(10) Patent No.: US 12,014,357 B2
(45) Date of Patent: *Jun. 18, 2024

(54) TAP TO AUTOFILL CARD DATA

(71) Applicant: Capital One Services, LLC, McLean, VA (US)

(72) Inventors: Jeffrey Rule, Chevy Chase, MD (US); Wayne Lutz, Fort Washington, MD (US); Paul Moreton, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 254 days.

This patent is subject to a terminal disclaimer.

(21) Appl. No.: 17/398,724

(22) Filed: Aug. 10, 2021

(65) Prior Publication Data

US 2021/0365929 A1 Nov. 25, 2021

Related U.S. Application Data

(60) Division of application No. 17/321,870, filed on May 17, 2021, which is a continuation of application No. 16/256,983, filed on Jan. 24, 2019, now Pat. No. 11,037,136.

(51) Int. Cl.
*G06Q 20/36* (2012.01)
*G06Q 20/34* (2012.01)
*G06Q 20/40* (2012.01)

(52) U.S. Cl.
CPC ....... *G06Q 20/3567* (2013.01); *G06Q 20/352* (2013.01); *G06Q 20/363* (2013.01); *G06Q 20/4018* (2013.01)

(58) Field of Classification Search
CPC ............ G06Q 20/3567; G06Q 20/352; G06Q 20/363; G06Q 20/4018
See application file for complete search history.

(56) References Cited

U.S. PATENT DOCUMENTS

| | | | |
|---|---|---|---|
| 11,138,675 B1 * | 10/2021 | Jonkers | G06F 40/174 |
| 2002/0032662 A1 * | 3/2002 | Maclin | G06Q 20/385 |
| | | | 705/64 |
| 2003/0182241 A1 | 9/2003 | Everhart | |
| 2015/0032635 A1 | 1/2015 | Guise | |

(Continued)

FOREIGN PATENT DOCUMENTS

KR 20090114278 A 11/2009

*Primary Examiner* — John W Hayes
*Assistant Examiner* — Zehra Raza
(74) *Attorney, Agent, or Firm* — KDW FIRM PLLC

(57) ABSTRACT

Various embodiments are generally directed to autofilling card data from a contactless card to a form of a computing device. An application may determine that a payment field of a form has received focus. The application may then receive encrypted data from a communications interface of a contactless card associated with an account. The application may then receive, from a server, verification of the encrypted data. The application may then receive, from the server, an encrypted account number associated with the account, and decrypt the encrypted account number to yield the account number. An autofill service of an operating system (OS) executing on the processor circuit, may then autofill the account number to the payment field of the form.

20 Claims, 11 Drawing Sheets

(56) References Cited

U.S. PATENT DOCUMENTS

| | | | |
|---|---|---|---|
| 2016/0026997 A1* | 1/2016 | Tsui | G06Q 20/3278 |
| | | | 705/44 |
| 2017/0262421 A1* | 9/2017 | Yue | H04L 63/00 |
| 2019/0188705 A1 | 6/2019 | Ecker et al. | |

* cited by examiner

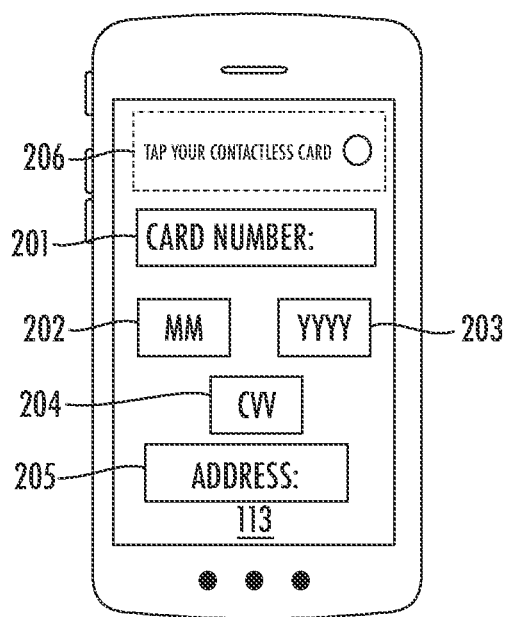
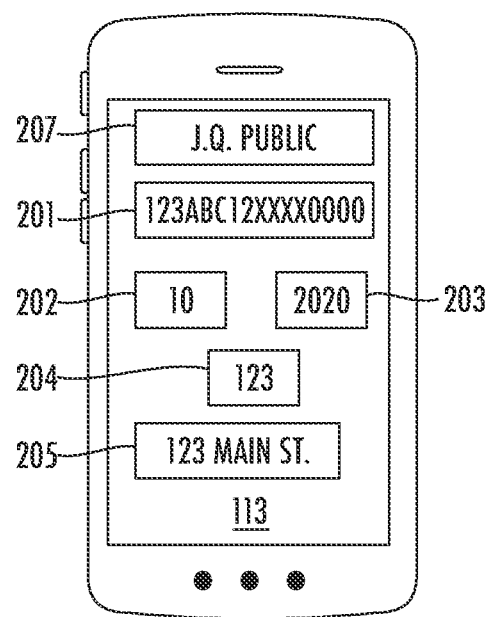
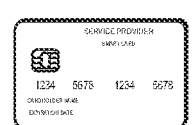
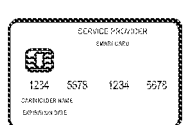
FIG. 2A    FIG. 2B

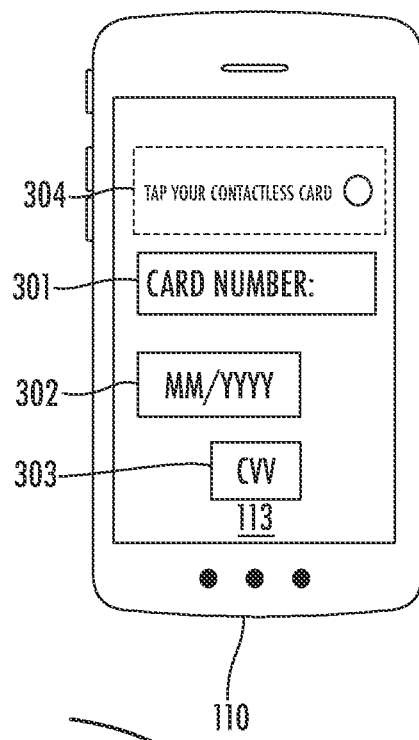
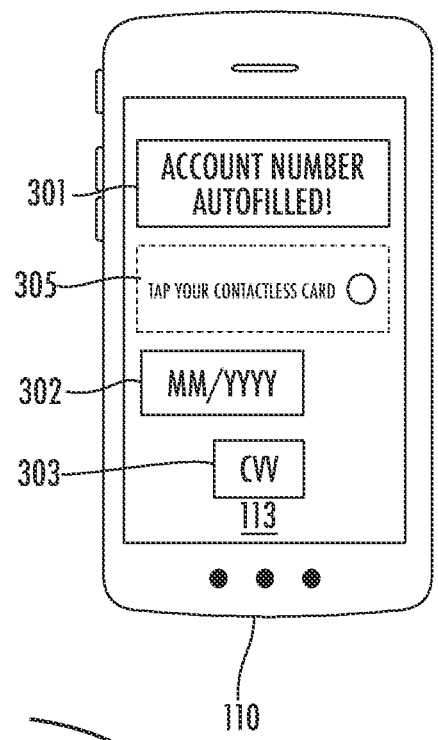
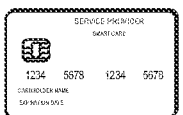
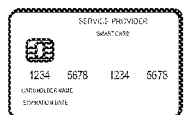
FIG. 3A  FIG. 3B

TAP TO AUTOFILL CARD DATA

CROSS-REFERENCE TO RELATED APPLICATIONS

This application is a Divisional of U.S. patent application Ser. No. 17/321,870 filed on May 17, 2021, which is a Continuation of U.S. patent application Ser. No. 16/256,983, filed on Jan. 24, 2019 (issued as U.S. Pat. No. 11,037,136 on Jun. 15, 2021). The contents of the aforementioned patent applications are incorporated herein by reference in their entireties.

TECHNICAL FIELD

Embodiments herein generally relate to computing platforms, and more specifically, to tapping a card to a computing device to initiate the autofill of payment data into a payment form on the computing device.

BACKGROUND

Account identifiers for payment cards are often long numeric and/or character strings. As such, it is difficult for a user to manually enter the account identifier correctly. Indeed, users often make mistakes and enter incorrect account numbers into computing interfaces (e.g., payment interfaces). Furthermore, processes have been developed that allow cameras to capture and identify account identifiers entered in a device, thereby posing security risks to account identifiers.

SUMMARY

Embodiments disclosed herein provide systems, methods, articles of manufacture, and computer-readable media for tapping to autofill card data to a form on a computing device. According to one example, an application may determine that a payment field of a form has received focus. The application may then receive encrypted data from a communications interface of a contactless card associated with an account, the encrypted data generated based on a cryptographic algorithm and a diversified key, the diversified key stored in a memory of the contactless card and generated based on a master key and a counter value stored in the memory of the contactless card. The application may then receive, from a server, verification of the encrypted data, the server to decrypt the encrypted data based on the cryptographic algorithm and the diversified key stored in a memory of the server to verify the encrypted data, the diversified key stored in the memory of the server generated based on a master key and a counter value stored in the memory of the server. The application may then receive, from the server, an encrypted account number associated with the account, and decrypt the encrypted account number to yield the account number. An autofill service of an operating system (OS) executing on the processor circuit, may then autofill the account number to the payment field of the form.

BRIEF DESCRIPTION OF THE DRAWINGS

FIGS. 2A-2B illustrate embodiments of tapping to autofill card data.
FIGS. 3A-3D illustrate embodiments of tapping to autofill card data.

DETAILED DESCRIPTION

Figure 1A:
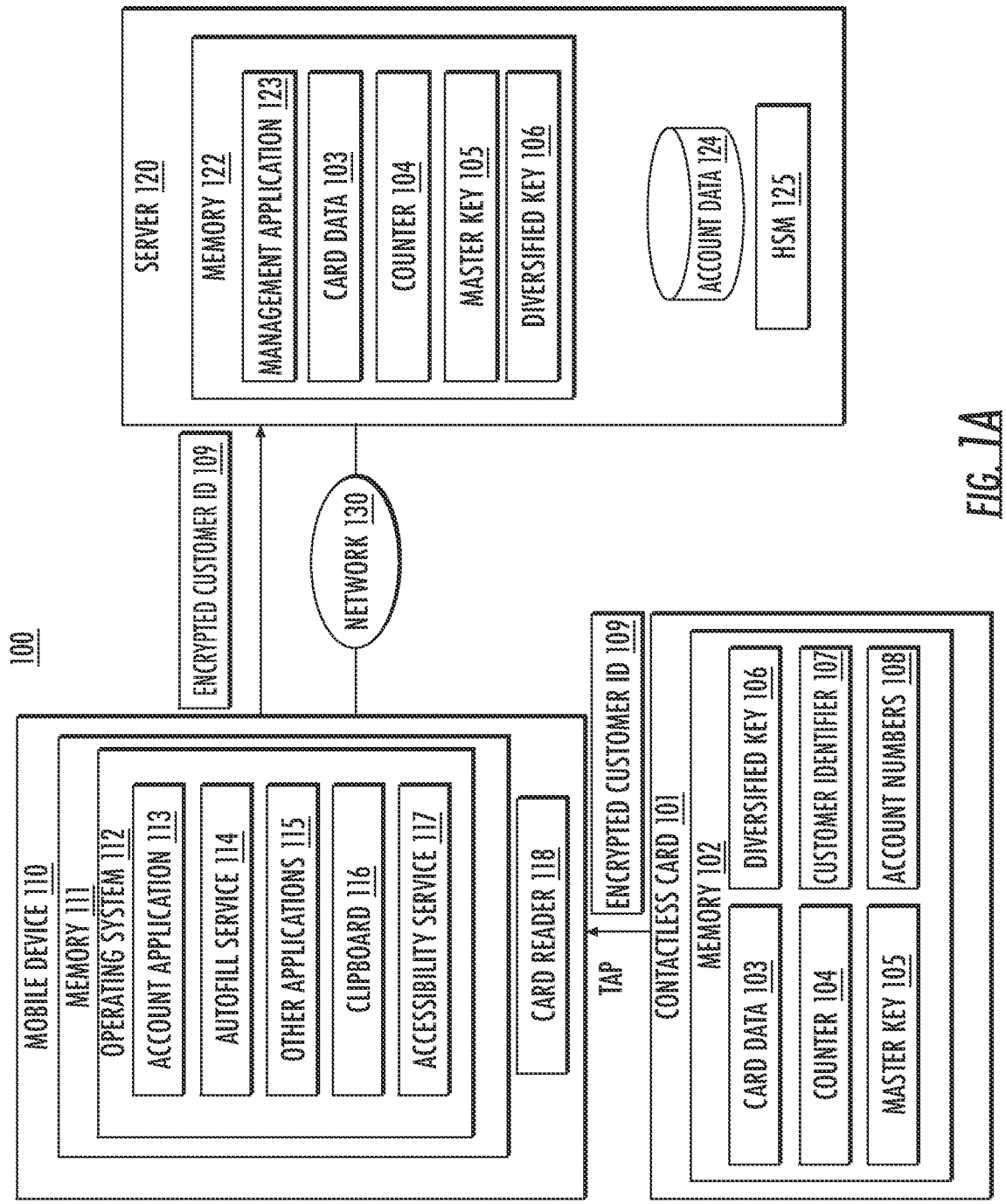
FIGS. 1A-1B illustrate embodiments of a system for tapping to autofill card data.

Embodiments disclosed herein provide secure techniques to autofill card data (e.g., an account number, expiration date, customer billing address, shipping address, and/or card verification value (CVV)) of a contactless card to a form of a computing device using an autofill service and/or an accessibility service. Generally, a user of a device may select a form field associated with payment (e.g., an account number field, expiration date field, CVV field, name, shipping address, and/or billing address), which brings focus to the form field. Upon determining the form field has received focus, the device may output an indication to tap the contactless card to the device. The user may then tap the contactless card to the device. The device may then instruct the contactless card to generate and transmit data to the application. In some embodiments, the data generated by the contactless card includes the account number, expiration date, billing address, and/or CVV value. In other embodiments, the data generated by the contactless card may be encrypted using key diversification. The application may transmit the encrypted data received from the contactless card to a server for verification. Upon verifying the data, the server may transmit card data (e.g., an account number, expiration date, name, addresses, and/or CVV) to the device. Whether received from the contactless card, from the server, or locally, the card data may then be provided to an autofill service of the operating system of the device. The autofill service may then automatically populate the card data to the form field (e.g., populate the account number into an account number form field, etc.).

Advantageously, doing so improves security of all devices and associated data. For example, conventional approaches require the user to manually enter the card data into a form. However, doing so may allow other users or devices to capture the card data as the user enters the card data into the form. By eliminating the need for the user to manually enter card data into the form, the security of the card data is enhanced. Furthermore, the validation performed by the server provides an additional safeguard to ensure that the correct card data is being entered into the form. Additionally, the generation and filling of virtual card numbers into the form protects the security of the actual account number of the contactless card, as conventional solutions require providing the actual account number of the contactless card into the form.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, and a server 120. The contactless cards 101 are representative of any type of payment card, such as a credit card, debit card, ATM card, gift card, and the like. The contactless cards 101 may comprise one or more chips (not depicted), such as a radio frequency identification (RFID) chip, configured to communicate with the mobile devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The server 120 is representative of any type of computing device, such as a server, workstation, compute cluster, cloud computing platform, virtualized computing system, and the like.

As shown, a memory 102 of the contactless card includes card data 103, a counter 104, a master key 105, a diversified key 106, a unique customer identifier 107, and a data store of account numbers 108. The card data 103 generally includes account-related information, such as information used to process a payment using the contactless card 101. For example, the card data 103 may comprise an account number, an expiration date, a billing address, and a card verification value (CVV). The account number may be any type of account number, such as a primary account number (PAN), a virtual account number, and/or a token generated based on the PAN. Other types of account numbers are contemplated, and the use of the account number or other types of card data 103 should not be considered limiting of the disclosure. The card data 103 may further include names, billing address, shipping address, and other account-related information. The account numbers 108 store one-time-use virtual account numbers with associated expiration dates and CVV values. For example, the account numbers 108 may include thousands single-use virtual account numbers, expiration dates, and CVV values. As described in greater detail herein, the contactless card 101 may provide the card data 103 and/or a record from the account numbers 108 to the account application 113 to autofill to a form via the autofill service 114 and/or the accessibility service 117.

As shown, a memory 111 of the mobile device 110 includes an instance of an operating system (OS) 112. Example operating systems 112 include the Android® OS, iOS®, Linux®, and Windows® operating systems. As shown, the OS 112 includes an account application 113, an autofill service 114, one or more other applications 115, a clipboard 116, and an accessibility service 117. The account application 113 allows users to perform various account-related operations, such as viewing account balances, purchasing items, and processing payments. Initially, a user must authenticate using authentication credentials to access the account application 113. For example, the authentication credentials may include a username and password, biometric credentials, and the like.

The autofill service 114 is generally configured to fill out one or more form fields by programmatically injecting data into the form fields. Stated differently, the autofill service 114 receives and stores data that can be automatically injected into forms within the OS 112 and/or any applications (e.g., the account application 113 and/or other applications 115) executing in the OS 112. For example, as described in greater detail herein, the autofill service 114 may automatically fill the name, billing address, shipping address, account number, expiration date, account billing address, and CVV fields of a form responsive to a tap of the contactless card 101 to the mobile device 110. In some embodiments, the account number is a virtual account number. In some embodiments, the autofill service 114 is associated with the account application 113. For example, the autofill service 114 may be installed on the mobile device 110 with the account application 113, and the user is prompted to enable the autofill service 114 subsequent to the installation. More generally, each time the account application 113 is opened, the account application 113 may determine whether the autofill service 114 is enabled as the default autofill service for the OS 112. If the autofill service 114 is not enabled as the default autofill service, the account application 113 may prompt the user to enable the autofill service 114 as the default autofill service for the OS 112. Once enabled as the default autofill service for the OS 112, the autofill service 114 may programmatically identify payment-related fields of forms, and prompt the user to tap a contactless card 101 to the mobile device 110 to autofill form fields with data associated with the contactless card 101 (e.g., one or more of a name, account number, expiration date, CVV, shipping address, and/or account billing address).

The accessibility service 117 is generally configured to assist users in using the mobile device 110. For example, the accessibility service 117 may automatically fill the name, account number, expiration date, shipping address, billing address, and CVV fields of a form responsive to verification of the encrypted customer ID 109 by the server 120, where the encrypted customer ID 109 is generated by the contactless card 101 responsive to a tap of the contactless card 101 to the mobile device 110. In one embodiment, the accessibility service 117 is used to autofill the name, account number, expiration date, shipping address, billing address, and CVV data in a form in an application such as a web browser. The autofill service 114 is used as a reference example herein for programmatically filling card data into a form. However, use of the autofill service 114 should not be considered limiting of the disclosure, as the disclosure is equally applicable to using the accessibility service 117 or other services (e.g., a password service, or other types of services) to programmatically fill card data into a form.

As shown, the server 120 includes a data store of account data 124 and a memory 122. The account data 124 includes account-related data for a plurality of users and/or accounts. The account data 124 may include at least a master key 105, counter 104, a customer ID 107, an associated contactless card 101, account holder name, account billing address, one or more shipping addresses, one or more virtual card numbers, and biographical information for each account. The memory 122 includes a management application 123 and instances of the card data 103, the counter 104, master key 105, and diversified key 106 for one or more accounts from the account data 124.

The system 100 is configured to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location). The master key may be kept secret from all parties other than the contactless card 101 and server 120, thereby enhancing security of the system 100.

The master keys 105 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). To enable NFC data transfer between the contactless card 101 and the mobile device 110, the account application 113 may communicate with the contactless card 101 when the contactless card 101 is sufficiently close to a card reader 118 of the mobile device 110. Card reader 118 may be configured to read from and/or communicate with contactless card 101 (e.g., via NFC, Bluetooth, RFID, etc.). Therefore, example card readers 118 include NFC communication modules, Bluetooth communication modules, and/or RFID communication modules.

For example, a user may tap the contactless card 101 to the mobile device 110, thereby bringing the contactless card 101 sufficiently close to the card reader 118 of the mobile device 110 to enable NFC data transfer between the contactless card 101 and the card reader 118 of the mobile device 110. In some embodiments, the mobile device 110 may trigger the card reader 118 via an API call. In addition and/or alternatively, the mobile device 110 may trigger the card reader 118 based on periodically polling the card reader 118. More generally, the mobile device 110 may trigger the card reader 118 to engage in communications using any feasible method. After communication has been established between mobile device 110 and contactless card 101, the contactless card 101 generates a message authentication code (MAC) cryptogram. In some examples, this may occur when the contactless card 101 is read by the account application 113. In particular, this may occur upon a read, such as an NFC read, of a near field data exchange (NDEF) tag, which may be created in accordance with the NFC Data Exchange Format. For example, a reader, such as the account application 113 and/or the card reader 118, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter value 104 maintained by the contactless card 101 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 101 may then transmit the MAC cryptogram to the mobile device 110, which may then forward the MAC cryptogram to the server 120 for verification as explained below. However, in some embodiments, the mobile device 110 may verify the MAC cryptogram.

More generally, when preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 101 may then encrypt the data (e.g., the customer identifier 107 and any other data) using the diversified key 106. The contactless card 101 may then transmit the encrypted data (e.g., the encrypted customer ID 109) to the account application 113 of the mobile device 110 (e.g., via an NFC connection, Bluetooth connection, etc.). The account application 113 of the mobile device 110 may then transmit the encrypted data to the server 120 via the network 130. In at least one embodiment, the contactless card 101 transmits the counter value 104 with the encrypted data. In such embodiments, the contactless card 101 may transmit an encrypted counter value 104, or an unencrypted counter value 104.

Upon receiving the encrypted customer ID 109, the management application 123 of the server 120 may perform the same symmetric encryption using the counter value 104 as input to the encryption, and the master key 105 as the key for the encryption. As stated, the counter value 104 may be specified in the data received from the mobile device 110, or a counter value 104 maintained by the server 120 to implement key diversification for the contactless card 101. The output of the encryption may be the same diversified key value 106 that was created by the contactless card 101. The management application 123 may then decrypt the encrypted customer ID 109 received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124 for the account.

Although the counter 104 is used as an example, other data may be used to secure communications between the contactless card 101, the mobile device 110, and/or the server 120. For example, the counter 104 may be replaced with a random nonce, generated each time a new diversified key 106 is needed, the full value of a counter value sent from the contactless card 101 and the server 120, a portion of a counter value sent from the contactless card 101 and the server 120, a counter independently maintained by the contactless card 101 and the server 120 but not sent between the two, a one-time-passcode exchanged between the contactless card 101 and the server 120, and a cryptographic hash of data. In some examples, one or more portions of the diversified key 106 may be used by the parties to create multiple diversified keys 106.

As shown, the server 120 may include one or more hardware security modules (HSM) 125. For example, one or more HSMs 125 may be configured to perform one or more cryptographic operations as disclosed herein. In some examples, one or more HSMs 125 may be configured as special purpose security devices that are configured to perform the one or more cryptographic operations. The HSMs 125 may be configured such that keys are never revealed outside the HSM 125, and instead are maintained within the HSM 125. For example, one or more HSMs 125 may be configured to perform at least one of key derivations, decryption, and MAC operations. The one or more HSMs 125 may be contained within, or may be in data communication with, server 120.

As stated, the key diversification technique may be used to perform secure operations using the contactless card 101. For example, once the management application 123 verifies the encrypted customer ID 109 using key diversification, the management application 123 may transmit an account number, expiration date, and/or CVV associated with the account to the account application 113 of the mobile device 110. The management application 123 may further include other information (e.g., first name, last name, shipping address, billing address, other account information, etc.). The account number may be a PAN, a virtual account number, and/or a token generated based on the PAN. The account application 113 may decrypt the received data (if encrypted) and provide the account number, expiration date, billing address, and/or CVV to an application programming interface (API) of the autofill service 114. The autofill service 114 may then automatically insert the account number in an account number field of a form, insert the expiration date in an expiration date field (or fields) of a form, insert the CVV into a CVV field of the form, insert the billing address into a billing address field of the form, insert the shipping address into a shipping address field of the form, and the name to a name field of the form.

In another embodiment, the card data 103 is read directly from the contactless card 101, which may be useful if the mobile device 110 does not have a connection to the server 120. For example, the account application 113 and/or the autofill service 114 may determine that a user has selected an account number field of a form, and that the account number field has received focus. In some embodiments, the account application 113 and/or autofill service 114 reads metadata of a form field to determine the type of information. For example, the metadata of a form field may specify that the form field is associated with the account number field, expiration date field, CVV field, shipping address field, and/or billing address field. In some embodiments, information such as the 16-digit card number, CVV, and customer name may be available offline, while other information such as addresses and generated virtual numbers are not available offline and may require a network connection. In response, the account application 113 and/or the autofill service 114 may output an indication to tap the contactless card 101 to the mobile device 110. In one embodiment, once the contactless card 101 is tapped to the mobile device 110, the contactless card 101 transmits the card data 103 to the mobile device 110. In another embodiment, once the contactless card 101 is tapped to the mobile device 110, the account application 113 may instruct the contactless card 101 to transmit the card data 103 to the mobile device 110. In one example, the contactless card 101 transmits the card data 103 (including one or more of the account number, expiration date, CVV value, the account holder's first name, and the account holder's last name) to the mobile device 110 in an NDEF file (e.g. via NFC, Bluetooth, and/or RFID). In another example, the contactless card 101 transmits the card data 103 using the EMV protocol. In examples where the EMV protocol is used, the card data 103 transmitted using the EMV protocol includes the account number, expiration date, the account holder's first name, and the account holder's last name. The contactless card 101 may then transmit the card data 103 to the account application 113 using the EMV protocol. In examples where the EMV protocol is used, the account application 113 may receive the CVV value from the contactless card 101 (e.g., via the NFC read to receive the CVV in an NDEF file) and/or from the management application 123 of the server 120. However, in some embodiments, the EMV protocol may be used to transmit the CVV value directly from the contactless card 101. The account application 113 may then provide the card data 103 (e.g., the account number, expiration date, and/or CVV) to the API of the autofill service 114. The autofill service 114 may then autofill the card data 103 to the form. For example, the autofill service 114 may autofill the account number in the account number field of the form. Similarly, the autofill service 114 may autofill the expiration date and/or CVV to the form.

In yet another embodiment, the contactless card 101 provides one of the account numbers 108 directly to the account application 113. For example, the account application 113 and/or the autofill service 114 may determine that a user has selected an account number field of a form, and that the account number field has received focus. For example, the account application 113 and/or the autofill service 114 may analyze an HTML attribute of the account number field to determine that the account number field has received focus. Furthermore, the account application 113 and/or the autofill service 114 may analyze the metadata of the account number field to determine that the field is associated with the account number. For example, the account application 113 and/or the autofill service 114 may determine, based on the metadata, that the account number field is configured to receive 16 characters as input. As another example, the metadata may specify a name for the form field that is similar to names associated with account number fields (e.g., "accountnumber", "account_number", etc.).

In response, the account application 113 and/or the autofill service 114 may output an indication to tap the contactless card 101 to the mobile device 110. Once the contactless card 101 is tapped to the mobile device 110, the account application 113 may instruct the contactless card 101 to transmit one of the account numbers 108 to the account application 113. The contactless card 101 may then select and encrypt an account number 108 (which includes a virtual account number, expiration date, CVV, and optionally the account holder's first name and last name). The contactless card 101 may then mark the selected account number 108 as being used (e.g., by deleting the selected account number 108, updating a "used" field or bit of the selected account number 108, etc.) and transmit the encrypted account number 108 to the account application 113. The account application 113 may then decrypt the account number 108 and provide the decrypted data to the autofill service 114. The autofill service 114 may then autofill one or more form fields with one or more of the virtual account number, expiration date, and CVV (and optionally the account holder's first name, last name, and billing address). In some embodiments, to autofill one or more account numbers 108, the contactless card 101 further generates an encrypted customer ID 109 according to the key diversification technique. In such embodiments, the account application 113 may receive the encrypted customer ID 109 from the contactless card and transmit the encrypted customer ID 109 to the management application 123 of the server 120 for verification. The account application 113 may wait for verification of the encrypted customer ID 109 before providing the account number, expiration date, and/or CVV to the autofill service 114. Therefore, if the encrypted customer ID 109 is not verified by the server 120, the account application 113 does not provide the account number 108 to the autofill service 114. However, in other embodiments, the verification of the encrypted customer ID 109 is not a condition to autofilling the virtual account numbers 108 of the contactless card 101.

Regardless of the technique used to provide card data 103 and/or the account number 108 to the autofill service 114, the account application 113 and/or the OS 112 may manage the data provided to the autofill service 114. For example, the card data 103 and/or the account number 108 may be deleted from the autofill service 114 after being stored in the autofill service 114 for a predefined amount of time. As another example, the card data 103 and/or the account number 108 may be deleted from the autofill service 114 after the card data 103 and/or the account number 108 has been used to make a purchase. Additionally and/or alternatively, the autofill service 114 may be modified to remove the card data 103 and/or the account number 108, e.g., by copying random data to the autofill service 114.

Furthermore, the account application 113 and/or the autofill service 114 may copy an account number to the clipboard 116 of the OS. The clipboard 116 stores data that can be copied and/or pasted within the OS 112. For example, the clipboard 116 may store data locally for pasting into fields of the mobile device 110, and a user may input/paste the data stored in the clipboard 116 using a command and/or gesture available within the OS 112. For example, copying the account number to the clipboard 116 allows the user to paste the account number to the corresponding form field using a command and/or gesture available within the OS 112. Further still, the autofill service 114 may output a notification which specifies the expiration date and the CVV while the account number is copied to the clipboard 116. Doing so allows the user to manually enter the expiration date and CVV to the corresponding form fields while the notification remains in view. In some embodiments, the account application 113 and/or the autofill service 114 may also copy the expiration date, billing address, and/or the CVV to the clipboard 116, allowing the expiration date, billing address, and/or the CVV to be pasted to the corresponding form fields.

Figure 1B:
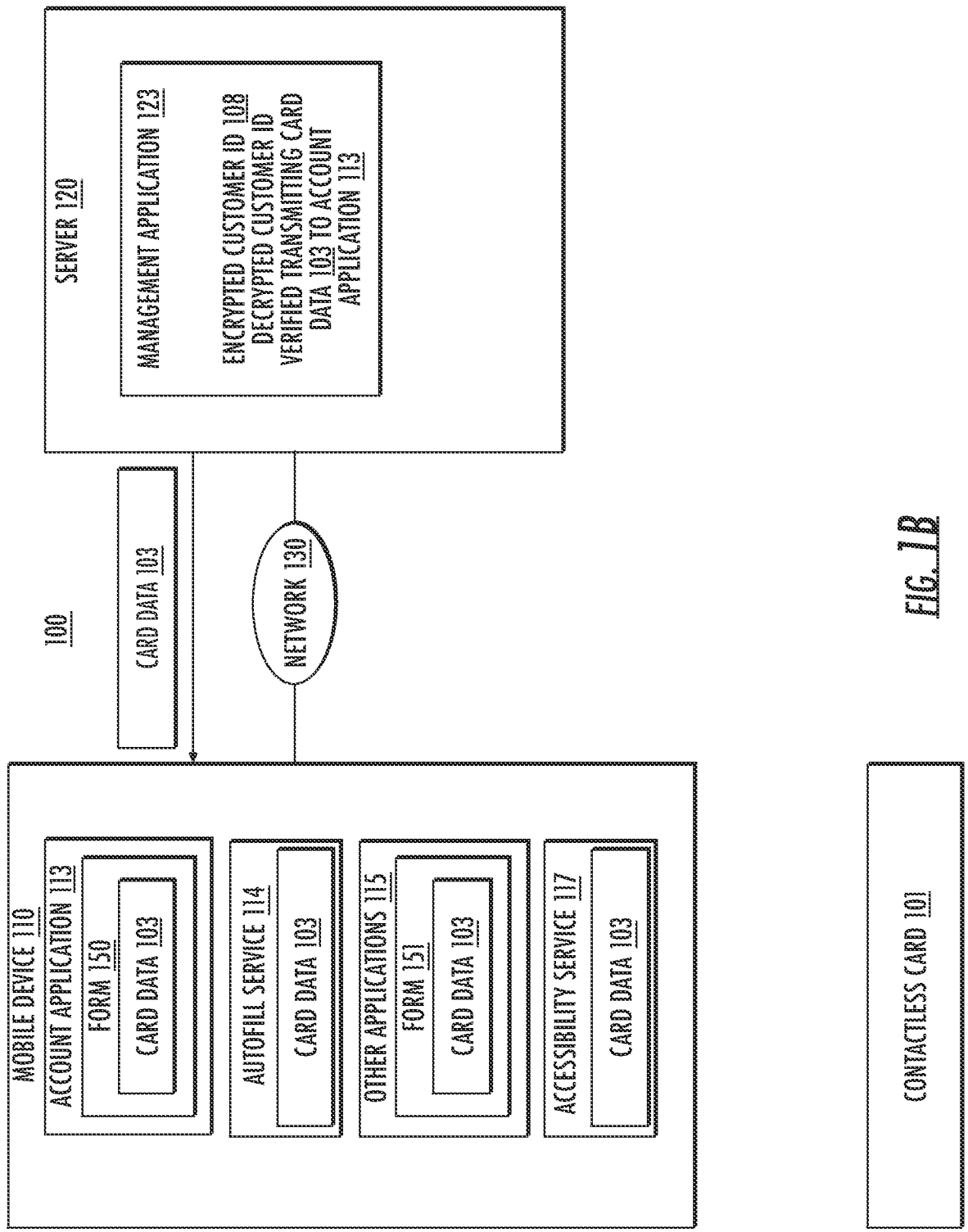

FIG. 1B depicts an example of using the key diversification technique to autofill the card data 103 to a form. As shown, the account application 113 includes a form 150. In operation, a user of the mobile device 110 may select a field of the form 150 that is associated with payment (e.g., a name field, an account number field, an expiration date field, a CVV field, shipping address field, and/or a billing address field). The account application 113 and/or the autofill service 114 may determine that a payment field of the form 150 (and/or a form 151 of the other applications 115) has received focus, e.g., based on a name of the field, a type of the field, etc. Generally, when a field of a form receives focus, input may be provided to that field (whether manually via user input, or programmatically via the autofill service 114 and/or the accessibility service 117). The account application 113 and/or the autofill service 114 may then instruct the user to tap the contactless card 101 to the mobile device 110. Once the contactless card 101 is tapped (e.g., brought within NFC communications range of the card reader 118) to the mobile device 110, the account application 113 generates and transmits an indication to the contactless card 101 to generate an encrypted customer ID 109 as depicted in FIG. 1A.

In response, the contactless card 101 increments the counter value 104 and provides the master key 105 and counter value 104 as input to a cryptographic algorithm, which produces a diversified key 106 as output. The contactless card 101 may then encrypt the customer identifier 107 using the diversified key 106 to generate the encrypted customer ID 109. The contactless card 101 may then transmit the encrypted customer ID 109 to the account application 113 of the mobile device 110 (e.g., via an NFC connection, Bluetooth connection, etc.). The account application 113 of the mobile device 110 may then transmit the encrypted customer ID 109 to the server 120 via the network 130. In at least one embodiment, the contactless card 101 transmits the counter value 104 along with the encrypted customer ID 109.

Upon receipt of the encrypted customer ID 109 via the card reader 118, the management application 123 of the server 120 verifies the encrypted customer ID 109 using key diversification. As stated, the management application 123 of the server 120 may perform the same symmetric encryption using the counter value 104 as input to the encryption, and the master key 105 as the key for the encryption, to generate the diversified key 106. The management application 123 may then decrypt the encrypted customer ID 109 received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124 for the account, where a match of the customer ID values verifies the encrypted data received from the contactless card 101. In some embodiments, once the management application 123 verifies the encrypted customer ID 109, the management application 123 generates a virtual card number for the associated account, or causes a virtual card number for the associated account to be generated.

As shown in FIG. 1B, after verifying the encrypted customer ID 109 of FIG. 1A, the management application 123 of the server 120 transmits the card data 103 from the server 120 to the mobile device 110. In at least one embodiment, the management application 123 encrypts the card data 103 before sending to the account application 113. As stated, the card data 103 may include the account number, CVV, and/or expiration date of the contactless card 101. The card data 103 may further include the account holder's first name, last name, shipping address, and billing address. In one embodiment, the account number of the card data 103 is the virtual card number generated subsequent to the verification of the encrypted customer ID 109 by the management application 123. In another embodiment, the account number of the card data 103 is a record from the account numbers 108. In one embodiment, the first and last names are stored in the account application 113 (or another element of the OS). In such embodiments, the account application 113 may provide the locally stored names to the autofill service 114 with the card data 103. Furthermore, as stated, the account number may comprise a virtual account number. The account application 113 may then receive the card data 103 and decrypt the received card data 103 (if the card data 103 has been encrypted). The account application 113 may then provide the card data 103 to an API of the autofill service 114 (and/or the accessibility service 117). The autofill service 114 and/or the accessibility service 117 may then populate one or more fields of the form 150 (and/or the form 151 of the other applications 115) with the corresponding card data 103 without requiring user input and without exposing the card data 103.

In one embodiment, the card data 103 sent by the server 120 to the mobile device 110 includes all relevant information (e.g., the account number, expiration date, CVV, billing address, shipping address, first name, last name, etc.) required to make a purchase using the account associated with the contactless card 101. However, in other embodiments, the individual elements of the card data 103 may be incrementally auto-filled by the autofill service 114 using one or more taps of the contactless card 101 and the mobile device 110. For example, a first tap of the contactless card 101 and the mobile device 110 may cause the autofill service 114 to autofill the account number of the card data 103 to an account number field of a form, while a second tap of the contactless card 101 and the mobile device 110 may cause the autofill service 114 to autofill the expiration date to an expiration date field (or fields) of the form, a third tap of the contactless card 101 and the mobile device 110 may cause the autofill service 114 to autofill the CVV to a CVV field of the form, and a fourth tap of the contactless card 101 and the mobile device 110 may cause the autofill service 114 to autofill the billing address to a billing address field of the form. In one embodiment, a separate encrypted customer ID 109 is generated by the contactless card 101 responsive to each tap, and the server 120 verifies each encrypted customer ID 109 before sending the corresponding card data 103 to the mobile device 110. In another embodiment, a single instance of the encrypted customer ID 109 is generated responsive to the initial tap, and the server 120 verifies this encrypted customer ID 109. In such an embodiment, the account application 113 may receive the name, account number, expiration date, CVV, shipping address, and billing address in a single response from the server 120, and provide the data to the autofill service 114 responsive to each tap of the contactless card 101 and the mobile device 110 based on a determination as to the data needed for the form field currently in focus.

FIG. 2A is a schematic 200 depicting an example embodiment of tapping to autofill card data. A graphical user interface (GUI) of the account application 113 on the mobile device 110 may include form fields 201-205, where field 201 corresponds to an account number field, field 202 corresponds to an expiration month field, field 203 corresponds to an expiration year field, field 204 corresponds to a CVV field, and field 205 corresponds to a billing address field. As shown, a notification 206 is outputted by the autofill service 114 and/or the account application 113 when the account number field 201 receives focus (e.g., is selected by the user). The notification 206 instructs the user to tap the contactless card 101 to the mobile device 110. In one embodiment, the user selects the notification 206 prior to tapping the contactless card 101 to the mobile device 110.

Once the contactless card 101 is tapped to the mobile device 110, the account application 113 transmits, via the card reader 118 (e.g., via NFC, Bluetooth, RFID, and/or the EMV protocol etc.), an indication to the contactless card 101. In one embodiment, the indication may specify to perform encryption using key diversification as depicted in FIG. 1A, in which case the account application 113 receives card data 103 from the server 120. In another embodiment, the indication may specify to transmit the card data 103 to the account application 113 in an NDEF file (e.g., via NFC, Bluetooth, RFID, etc.), in which case the account application 113 receives the card data 103 in an NDEF file directly from the contactless card 101 via the card reader 118. In another embodiment, the indication may specify to transmit the card data 103 to the account application 113 via the EMV protocol, in which case the account application 113 receives the card data 103 directly from the contactless card 101 via the EMV protocol. However, as stated, in embodiments where the EMV protocol is used, the CVV value is received from the contactless card 101 in an NDEF file and/or from the management application 123. In another embodiment, the indication may specify to perform encryption using key diversification as depicted in FIG. 1A and transmit an account number 108 to the account application 113, in which case the account application 113 receives a record from the account numbers 108 from the contactless card 101 (which is used subject to verification of the encrypted customer ID 109 by the server 120). Regardless of the particular technique used, the contactless card 101 and/or the server 120 may transmit an account number, expiration date, CVV, account billing address, and/or an account holder's name to the account application 113. However, as stated, in some embodiments, the account holder's name is stored locally (e.g., in the account application 113), and is not received from the contactless card 101 and/or the server 120. As stated, the account number may be a PAN, virtual account number, and/or a token generated based on the PAN. If the received data is encrypted, the account application 113 may decrypt the data. The account application 113 may then provide the decrypted account number, expiration date, and/or CVV to an API of the autofill service 114, which autofills the form fields 201-204 with the received data.

FIG. 2B is a schematic 210 depicting the account application 113 after the autofill service 114 has auto-filled the account number into the account number field 201, the expiration month into the expiration month field 202, the expiration year into the expiration year field 203, the CVV into the CVV field 204, and the billing address into the billing address field 205. The particular values depicted in FIG. 2B are exemplary and should not be considered limiting of the disclosure. Furthermore, as stated, the autofill service 114 may further autofill the account holder's name into a name field 207 of the form.

Figure 3C:
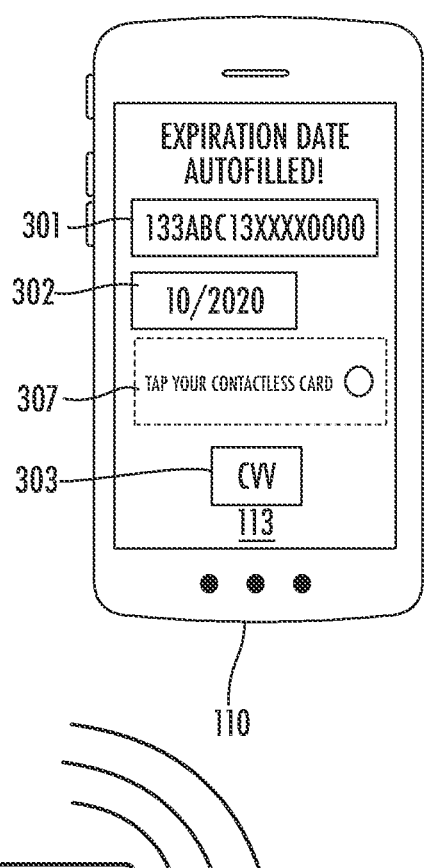

FIG. 3A is a schematic 300 depicting an example embodiment of tapping to autofill card data. Generally, FIGS. 3A-3D reflect an embodiment where successive taps are used to autofill an account number, expiration date, and CVV to a form. As shown, the GUI of the account application 113 includes a form having fields 301-303, where field 301 is an account number field, field 302 is an expiration date field, and field 303 is a CVV field. As shown, the account application 113 and/or the autofill service 114 on the mobile device 110 may output a notification 304 specifying to tap the contactless card 101 to the mobile device 110, e.g., responsive to determining the field 301 has received focus.

Once the contactless card 101 is tapped to the mobile device 110, the account application 113 transmits, via the card reader 118, an indication to the contactless card 101 to transmit data. For example, the indication may specify to transmit the account number of the card data 103 directly to the mobile device 110 via the EMV protocol. In response, the contactless card 101 may transmit the account number of the card data 103 via the EMV protocol. In another embodiment, the indication may specify to transmit a virtual account number from the account numbers 108. In response, the contactless card 101 may transmit the virtual account number from the account numbers 108 to the account application 113 via NFC. However, as stated, in embodiments where the virtual account numbers 108 are used, the contactless card 101 may generate an encrypted customer ID 109 using key diversification, which is provided to the account application 113 and transmitted to the server 120 for verification.

In another embodiment, the indication may specify to the contactless card 101 to perform encryption using key diversification as described above to generate encrypted data (e.g., the encrypted customer ID 109), and transmit the encrypted data to the account application 113. The account application 113 may then transmit the encrypted data to the server 120, where the management application 123 verifies the encrypted data using key diversification as described above. The management application 123 may then transmit the account number to the account application 113.

Regardless of the technique used to receive the account number, the account application 113 may provide the received account number to the API of the autofill service 114. As depicted in schematic 310 of FIG. 3B, the autofill service 114 may then autofill the account number to the account number field 301. Furthermore, once the user taps the expiration date field 302, the account application 113 and/or the autofill service 114 may output a notification 305 to tap the contactless card 101 to autofill the expiration date to the expiration date field 302.

Responsive to the tap of the contactless card 101 to the mobile device 110, the account application 113 receives the expiration date of the contactless card 101. As stated, in one embodiment, the account application 113 may receive the expiration date directly from the contactless card 101 using the EMV protocol. In another embodiment, the contactless card 101 may transmit the expiration date from the account numbers 108 (e.g., the expiration date of the virtual account number from the account numbers 108 auto-filled in account number field 301). In another embodiment, the account application 113 receives the expiration date from the management application 123 of the server based on verification of encrypted data generated by the contactless card 101. Once received, the account application 113 provides the expiration date to the API of the autofill service 114.

FIG. 3C is a schematic 320 illustrating an embodiment where the autofill service 114 has auto-filled the expiration date to the expiration date field 302. Furthermore, once the user taps the CVV field 303, the account application 113 may output a notification 307 to tap the contactless card 101 to autofill the CVV of the contactless card 101 to the CVV field 303. Responsive to the tap of the contactless card 101 to the mobile device 110, the account application 113 receives the CVV value of the contactless card 101. As stated, in one embodiment, the account application 113 may receive the CVV value directly from the contactless card 101 in an NDEF file (e.g., via NFC, RFID, Bluetooth, etc.). In another embodiment, the contactless card 101 may transmit the CVV from the account numbers 108 (e.g., the CVV value of the virtual account number from the account numbers 108 auto-filled in account number field 301). In another embodiment, the account application 113 receives the CVV value from the management application 123 of the server based on verification of encrypted data generated by the contactless card 101. Once received, the account application 113 provides the CVV value to the API of the autofill service 114.

Figure 3D:
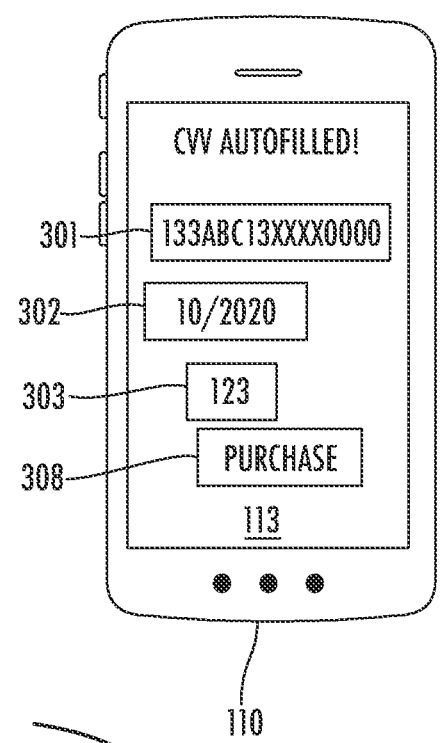

FIG. 3D is a schematic 330 illustrating an embodiment where the autofill service 114 has auto-filled the CVV value to the CVV field 303. Although not depicted, in some embodiments, the billing address may be auto-filled into a billing address field of the form responsive to a tap of the contactless card 101 to the mobile device. Doing so allows for automatic entry of the data required to complete a purchase or transaction, which the user may complete via the GUI element 308.

In some embodiments, the initial tap of the contactless card 101 to the mobile device 110 (e.g., the tap depicted in FIG. 3A) causes the contactless card 101 and/or the server 120 to transfer the account number, expiration date, the CVV, and the billing address to the account application 113 (e.g., in an NDEF file). In some embodiments, the account application 113 may provide the account number from the NDEF file to the autofill service 114 responsive to the first tap in combination with detection and identification of the data necessary for a field currently in focus (e.g., the account number field). The autofill service 114 may then autofill the account number to an account number form field. Responsive to the second tap, the account application 113 may provide the expiration date from the NDEF file to the autofill service 114 based on detecting and identifying the data necessary for the field currently in focus (e.g., the expiration date field) and without having to receive any additional data from the contactless card 101 and/or the server 120. The autofill service 114 may then autofill the expiration date to one or more expiration date fields of the form. Responsive to the third tap, the account application 113 provides the CVV from the NDEF file to the to the autofill service 114 based on detecting and identifying the data necessary for the field currently in focus (e.g., the CVV field) and without having to receive any additional data from the contactless card 101 and/or the server 120. The autofill service 114 may then autofill the CVV to a CVV form field. If additional fields are present (e.g., a name field, billing address field, etc.), additional taps of the contactless card 101 cause the account application 113 to provide the corresponding data elements (e.g., the account holder name, billing address, etc.) to the autofill service 114 based on detecting and identifying the data necessary for the field currently in focus and without having to receive any additional data from the contactless card 101 and/or the server 120. The autofill service 114 may then autofill the data to the form fields (e.g., the billing address to the billing address field, the name to the name field, etc.).

Figure 4A:
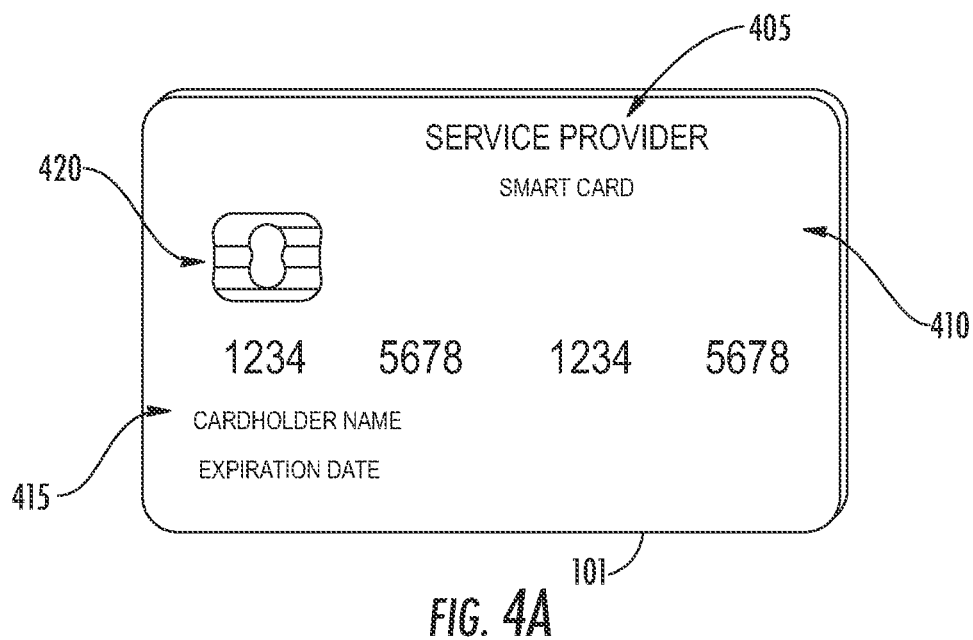
FIGS. 4A-4B illustrate an example contactless card.

FIG. 4A illustrates a contactless card 101, which may comprise a payment card, such as a credit card, debit card, and/or a gift card. As shown, the contactless card 101 may be issued by a service provider 405 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 410, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 415 displayed on the front and/or back of the card, and a contact pad 420. The contact pad 420 may be configured to establish contact with another communication device, such as the mobile devices 110, a user device, smart phone, laptop, desktop, or tablet computer. The contactless card 101 may also include processing circuitry, antenna and other components not shown in FIG. 4A. These components may be located behind the contact pad 420 or elsewhere on the substrate 410. The contactless card 101 may also include a magnetic strip or tape, which may be located on the back of the card (not shown in FIG. 4A).

Figure 4B:
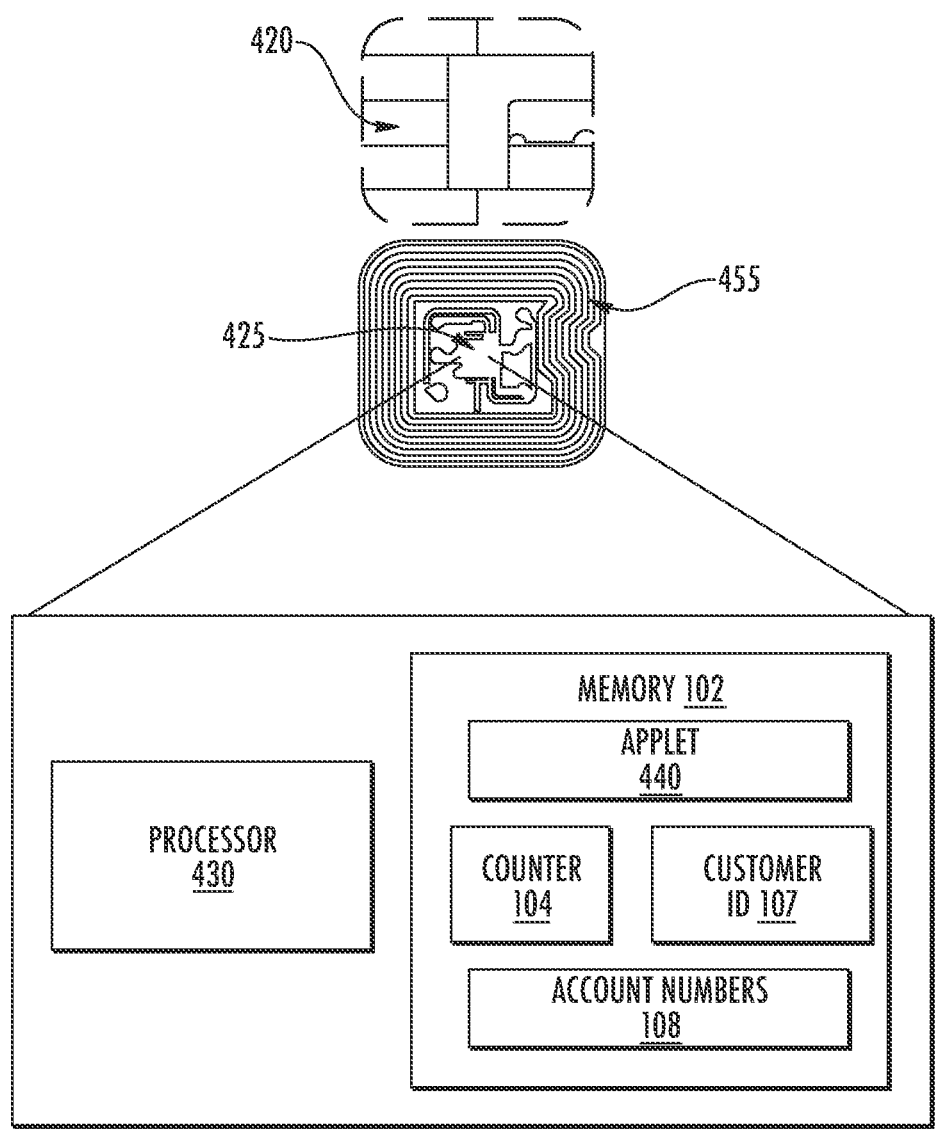

As illustrated in FIG. 4B, the contact pad 420 of contactless card 101 may include processing circuitry 425 for storing and processing information, including a microprocessor 430 and the memory 102. It is understood that the processing circuitry 425 may contain additional components, including processors, memories, error and parity/CRC checkers, data encoders, anticollision algorithms, controllers, command decoders, security primitives and tamper-proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 440, one or more counters 104, a customer identifier 107, and the virtual account numbers 108. The one or more applets 440 may comprise one or more software applications configured to execute on one or more contactless cards, such as a Java® Card applet. However, it is understood that applets 440 are not limited to Java Card applets, and instead may be any software application operable on contactless cards or other devices having limited memory. The one or more counters 104 may comprise a numeric counter sufficient to store an integer. The customer identifier 107 may comprise a unique alphanumeric identifier assigned to a user of the contactless card 101, and the identifier may distinguish the user of the contactless card from other contactless card users. In some examples, the customer identifier 107 may identify both a customer and an account assigned to that customer and may further identify the contactless card associated with the customer's account. As stated, the account numbers 108 may include thousands of one-time use virtual account numbers associated with the contactless card 101. An applet 440 of the contactless card 101 may be configured to manage the account numbers 108 (e.g., to select an account number 108, mark the selected account number 108 as used, and transmit the account number 108 to the mobile device 110 for autofilling by the autofill service 114).

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to processor 430 and memory 102 elements located within the contact pad 420.

In some examples, the contactless card 101 may comprise one or more antennas 455. The one or more antennas 455 may be placed within the contactless card 101 and around the processing circuitry 425 of the contact pad 420. For example, the one or more antennas 455 may be integral with the processing circuitry 425 and the one or more antennas 455 may be used with an external booster coil. As another example, the one or more antennas 455 may be external to the contact pad 420 and the processing circuitry 425.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 455, processing circuitry 425, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets 440 may be added to contactless cards to provide a one-time password (OTP) for multifactor authentication (MFA) in various mobile application-based use cases. Applets 440 may be configured to respond to one or more requests, such as near field data exchange requests, from a reader, such as a mobile NFC reader (e.g., of the mobile device 110), and produce an NDEF message that comprises a cryptographically secure OTP encoded as an NDEF text tag.

One example of an NDEF OTP is an NDEF short-record layout (SR=1). In such an example, one or more applets 440 may be configured to encode the OTP as an NDEF type 4 well known type text tag. In some examples, NDEF messages may comprise one or more records. The applets 440 may be configured to add one or more static tag records in addition to the OTP record.

In some examples, the one or more applets 440 may be configured to emulate an RFID tag. The RFID tag may include one or more polymorphic tags. In some examples, each time the tag is read, different cryptographic data is presented that may indicate the authenticity of the contactless card. Based on the one or more applications, an NFC read of the tag may be processed, the data may be transmitted to a server, such as the server 120, and the data may be validated at the server.

In some examples, the contactless card 101 and server 120 may include certain data such that the card may be properly identified. The contactless card 101 may comprise one or more unique identifiers (not pictured). Each time a read operation takes place, the counters 104 may be configured to increment. In some examples, each time data from the contactless card 101 is read (e.g., by a mobile device 110), the counter 104 is transmitted to the server for validation and determines whether the counter values 104 are equal (as part of the validation).

The one or more counters 104 may be configured to prevent a replay attack. For example, if a cryptogram has been obtained and replayed, that cryptogram is immediately rejected if the counter 104 has been read or used or otherwise passed over. If the counter 104 has not been used, it may be replayed. In some examples, the counter that is incremented on the card is different from the counter that is incremented for transactions. The contactless card 101 is unable to determine the application transaction counter 104 since there is no communication between applets 440 on the contactless card 101. In some examples, the contactless card 101 may comprise a first applet 440-1, which may be a transaction applet, and a second applet 440-2. Each applet 440-1 and 440-2 may comprise a respective counter 104.

In some examples, the counter 104 may get out of sync. In some examples, to account for accidental reads that initiate transactions, such as reading at an angle, the counter 104 may increment but the application does not process the counter 104. In some examples, when the mobile device 110 is woken up, NFC may be enabled and the device 110 may be configured to read available tags, but no action is taken responsive to the reads.

To keep the counter 104 in sync, an application, such as a background application, may be executed that would be configured to detect when the mobile device 110 wakes up and synchronize with the server 120 indicating that a read that occurred due to detection to then move the counter 104 forward. In other examples, Hashed One Time Password may be utilized such that a window of mis-synchronization may be accepted. For example, if within a threshold of 10, the counter 104 may be configured to move forward. But if within a different threshold number, for example within 10 or 1000, a request for performing re-synchronization may be processed which requests via one or more applications that the user tap, gesture, or otherwise indicate one or more times via the user's device. If the counter 104 increases in the appropriate sequence, then it possible to know that the user has done so.

The key diversification technique described herein with reference to the counter 104, master key 105, and diversified key 106 is one example of encryption and/or decryption a key diversification technique. This example key diversification technique should not be considered limiting of the disclosure, as the disclosure is equally applicable to other types of key diversification techniques.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5:
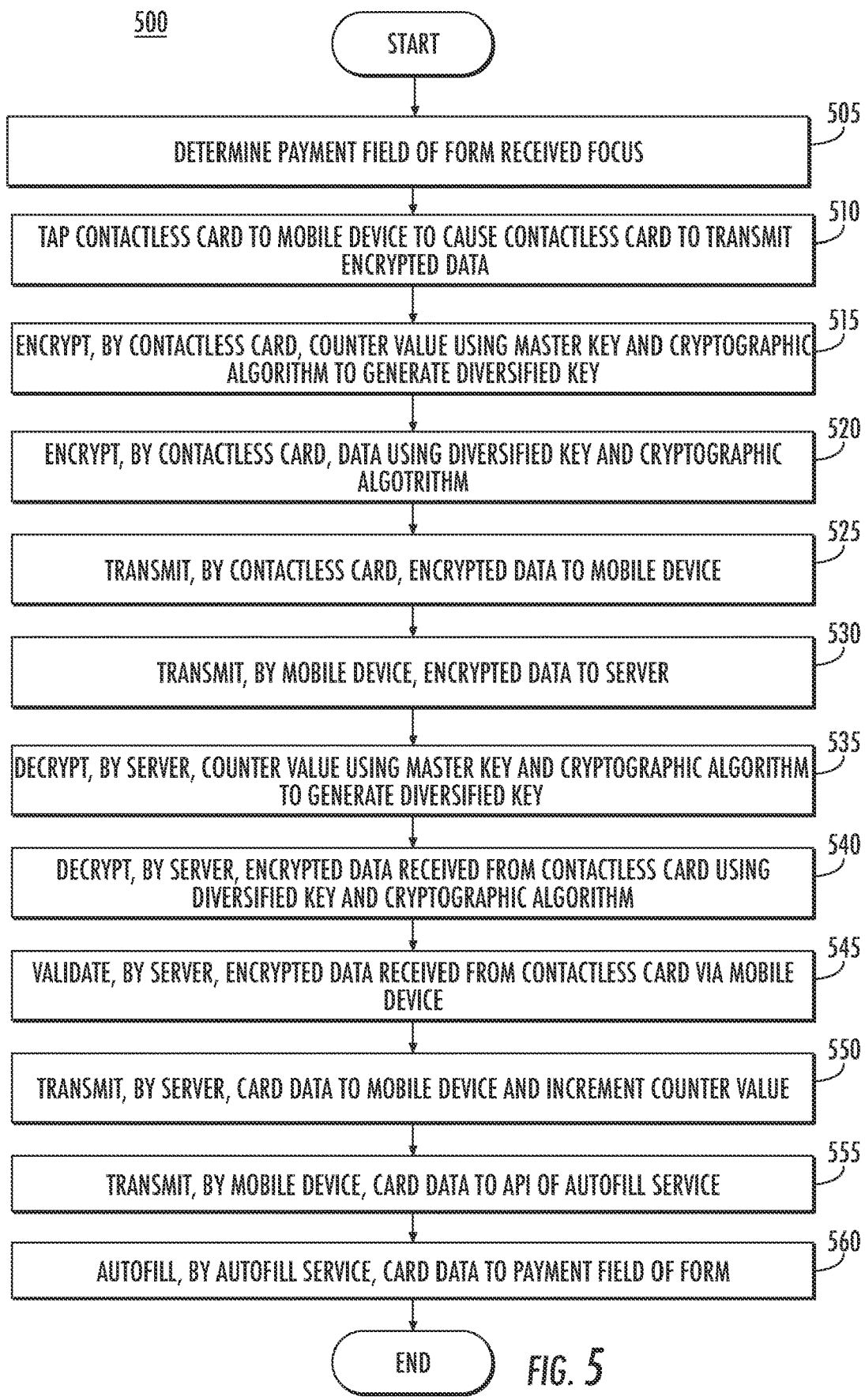
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations to securely autofill data associated with a contactless card 101 to a form using key diversification. Embodiments are not limited in this context.

As shown, the logic flow 500 begins at block 505, where the account application 113, the OS 112, and/or the autofill service 114 determine that a payment field of a form has received focus. For example, a user may tap the payment field of the form to give the payment field focus. As another example, the user may select the payment field of the form using a mouse and/or keyboard. More generally, any technique may be used to give the payment field focus, including programmatically generated focus. For example, the payment field may receive focus based on the hypertext markup language (HTML) "focus( )" method. As another example, the payment field may automatically receive focus when the form is loaded, e.g., based on the "autofocus" HTML attribute being applied to the payment field in source code. The payment field may include one or more of a name field, an account number field, expiration date field, a shipping address field, a billing address field, and/or a CVV field. Once the payment field receives focus, the account application 113, the OS 112, and/or the autofill service 114 may output a notification specifying to the user to tap the contactless card 101 to the mobile device 110. In some embodiments, the notification may be generated based on a determination that the form includes one or more payment fields. The notification may include a GUI which shows depicts an example of how to tap the contactless card 101 to the mobile device 110. At block 510, a user taps the contactless card 101 to the mobile device to cause the contactless card 101 to generate and transmit encrypted data (e.g., the encrypted customer ID 109). The user may tap the contactless card 101 responsive to a notification specifying to tap the contactless card 101 to autofill account-related data into the form. The account application 113 may transmit an indication to the contactless card 101 via the NFC card reader 118 specifying to generate and transmit encrypted data. The contactless card 101 may increment the counter value 104 in the memory 102 responsive to receiving the indication to generate encrypted data. At block 515, the contactless card 101 generates the diversified key 106 using the counter value 104 and the master key 105 in the memory 102 and a cryptographic algorithm. At block 520, the contactless card 101 encrypts data (e.g., the customer identifier 107) using the diversified key 106 and the cryptographic algorithm, generating encrypted data (e.g., the encrypted customer ID 109).

At block 525, the contactless card 101 may transmit the encrypted data to the account application 113 of the mobile device 110, e.g., using NFC. In at least one embodiment, the contactless card 101 further includes an indication of the counter value 104 along with the encrypted data. At block 530, the account application 113 of the mobile device 110 may transmit the data received from the contactless card 101 to the management application 123 of the server 120. At block 535, the management application 123 of the server 120 may generate a diversified key 106 using the master key 105 and the counter value 104 as input to a cryptographic algorithm. In one embodiment, the management application 123 uses the counter value 104 provided by the contactless card 101. In another embodiment, the management application 123 increments the counter value 104 in the memory 122 to synchronize the state of the counter value 104 in the memory 122 with the counter value 104 in the memory 102 of the contactless card 101.

At block 540, the management application 123 decrypts the encrypted data received from the contactless card 101 via the mobile device 110 using the diversified key 106 and a cryptographic algorithm. Doing so may yield at least the customer identifier 107. By yielding the customer identifier 107, the management application 123 may validate the data received from the contactless card 101 at block 545. For example, the management application 123 may compare the customer identifier 107 to a customer identifier for the associated account in the account data 124, and validate the data based on a match.

At block 550, the management application 123 may transmit card data 103 associated with the contactless card 101 to the account application 113 of the mobile device 110. For example, the management application 123 may transmit the account number, expiration date, shipping address, billing address, and CVV. The management application 123 may further transmit the name of the account holder. In one embodiment, the management application 123 generates a virtual account number that is sent to the account application 113 of the mobile device 110. At block 555, the account application 113 of the mobile device 110 provides the card data 103 received from the server 120 to an API of the autofill service 114 of the OS 112. At block 560, the autofill service 114 automatically fills the card data 103 (or at least a portion thereof) to one or more fields of a form. For example, if the form field that received focus is an account number field, the autofill service 114 may autofill the account number to the account number field. In some embodiments, the autofill service 114 fills all payment fields of the form (e.g., the account number, expiration date, CVV value, billing address, and account holder name) at block 560. The form may be a component of the account application 113, the other applications 115, and/or the OS 112.

Figure 6:
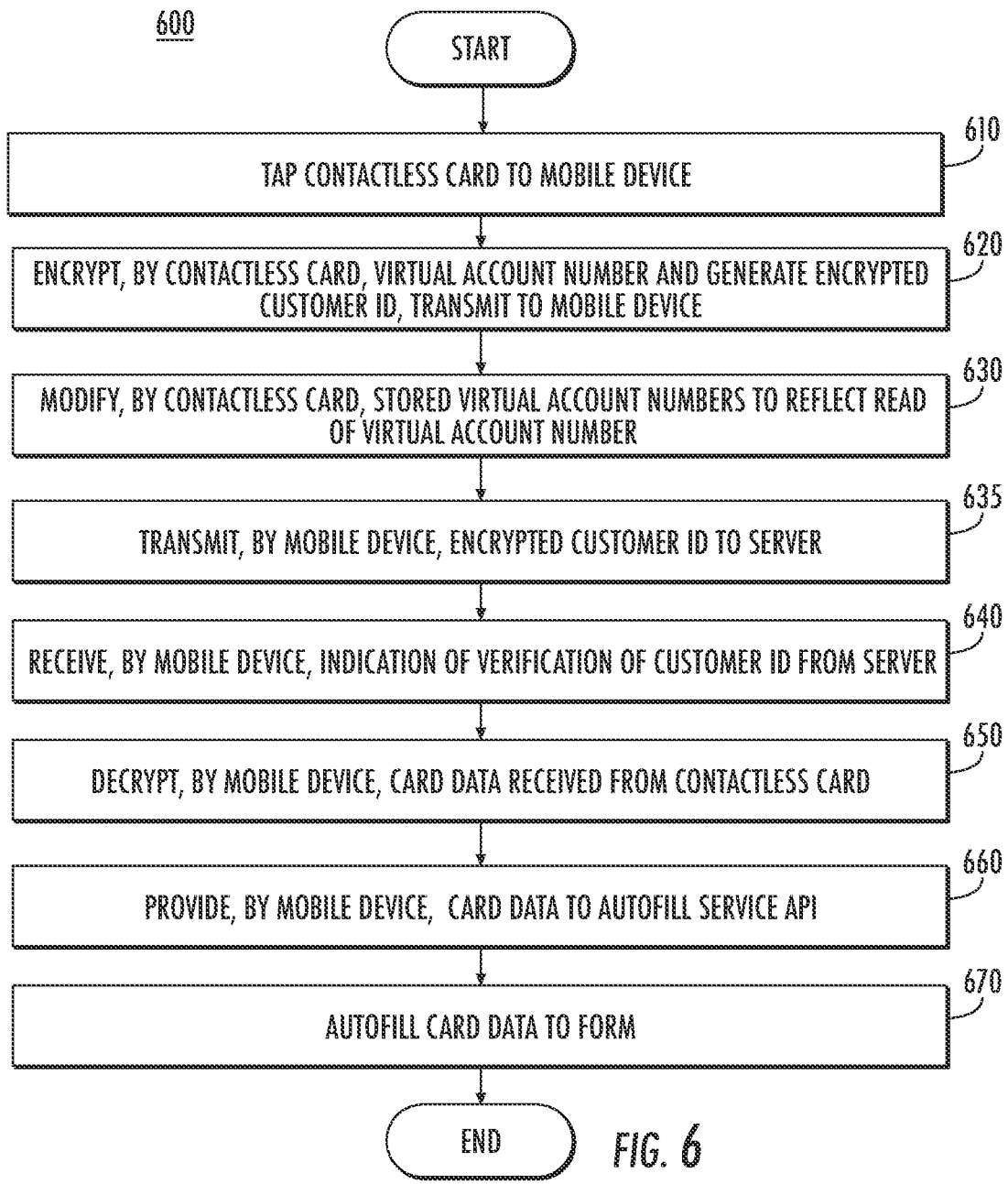
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include some or all of the operations to autofill virtual card numbers stored in the contactless card 101. Embodiments are not limited in this context.

As shown, the logic flow 600 begins at block 610, where a user taps the contactless card 101 to the mobile device 110. For example, the account application 113 and/or the autofill service 114 may determine that a payment field of a form has received focus and output a notification to tap the contactless card 101 to the mobile device 110. Doing so causes the account application 113 to transmit an indication to the contactless card 101 via the card reader 118 to transmit one of the account numbers 108 to the mobile device 110. At block 620, an applet 440 of the contactless card 101 selects a record from the account numbers 108. The applet 440 may encrypt the virtual account number, CVV, and expiration date of the selected record. The applet 440 may further generate an encrypted customer ID 109 using the key diversification technique described above. The applet 440 may then transmit the encrypted record from the account numbers 108 (which may include the encrypted virtual account number, expiration date, and CVV) and the encrypted customer ID 109 to the account application 113 of the mobile device 110 via NFC. The account application 113 may forward the encrypted customer ID 109 to the server 120 for verification as described above. At block 630, the applet 440 of the contactless card 101 modifies the virtual account numbers 108 to reflect the read of the virtual account number at block 620. For example, the applet 440 may delete the record for the virtual account number read at block 620 from the account numbers 108.

At block 635, the account application 113 transmits the encrypted customer ID 109 to the management application 123 of the server 120. At block 640, the account application 113 receives an indication from the server 120 that the management application 123 verified the encrypted customer ID 109 as described above. Doing so enhances security of the virtual account number 108. At block 650, the account application 113 decrypts the encrypted data received from the contactless card 101, yielding the virtual account number, expiration date, CVV, and user name. At block 660, the account application 113 may provide the decrypted data to the autofill service 114. The account application 113 may further provide additional information such as the billing address and the account holder name to the autofill service 114. At block 670, the autofill service 114 autofills the data (including virtual account number, expiration date, and CVV) to a form of the account application 113, other applications 115, and/or the OS 112.

Figure 7:
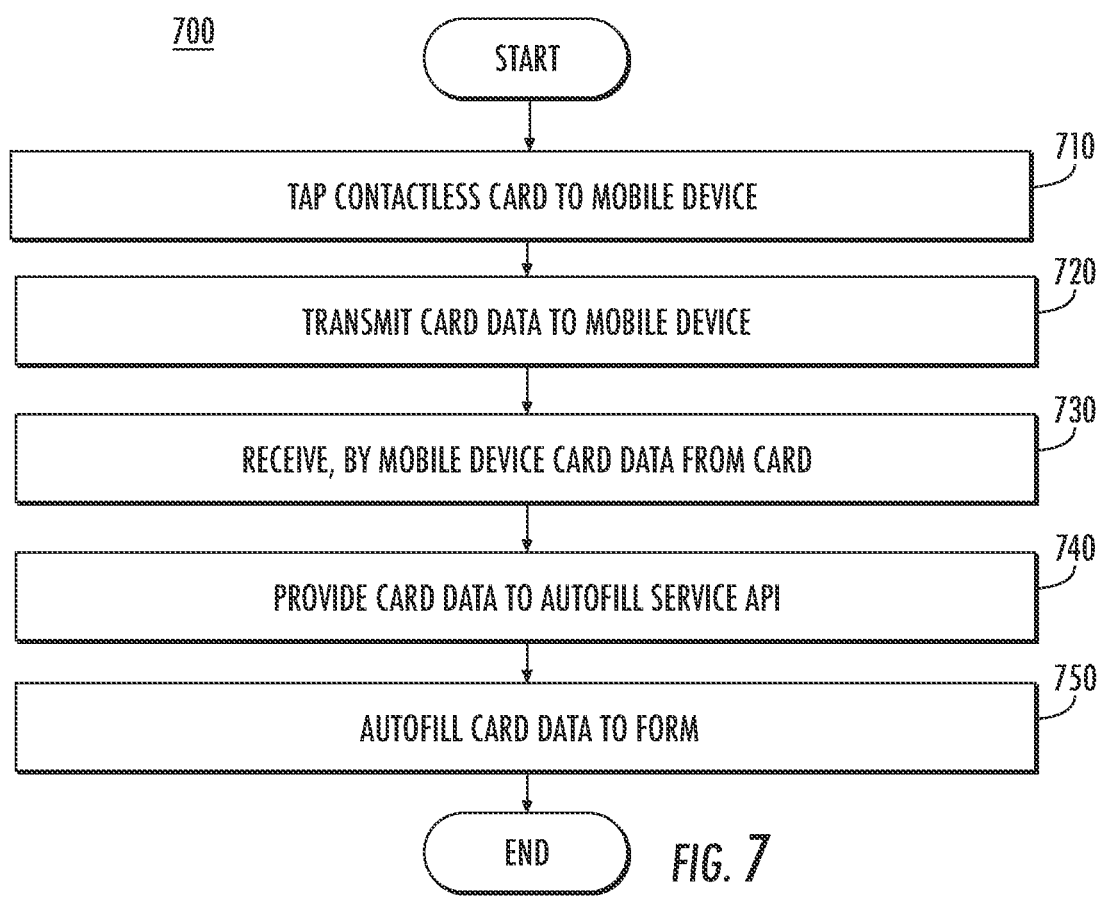
FIG. 7 illustrates an embodiment of a third logic flow.

FIG. 7 illustrates an embodiment of a logic flow 700. The logic flow 700 may be representative of some or all of the operations executed by one or more embodiments described herein. For example, the logic flow 700 may include some or all of the operations to autofill card data 103 stored in the contactless card 101. Embodiments are not limited in this context.

As shown, the logic flow 700 begins at block 710, where a user taps the contactless card 101 to the mobile device 110. For example, the account application 113 and/or the autofill service 114 may determine that a payment field of a form has received focus and output a notification to tap the contactless card 101 to the mobile device 110. As another example, the account application 113 and/or the autofill service 114 may determine that the form includes payment fields (e.g., based on the metadata of each form field). Doing so causes the account application 113 to transmit an indication to the contactless card 101 via the card reader 118 to transmit the card data 103 via the EMV protocol. At block 720, the contactless card 101 transmits the card data 103 to the account application 113 via the EMV protocol. The card data 103 may include the account number (e.g., PAN), expiration date, and account holder's name. In some embodiments, the card data 103 may further include the CVV.

At block 730, the account application 113 receives the card data 103 from the contactless card 101. At block 740, the account application 113 provides the received card data 103 to the API of the autofill service 114. At block 750, the autofill service 114 autofills the card data 103 to a form, e.g., by populating at least the PAN to an account number field, the expiration date to an expiration date field. The autofill service 114 may further autofill the account holder's name and CVV to the corresponding form fields.

In some examples, the contactless card 101 may be tapped to a device, such as one or more computer kiosks or terminals, to verify identity so as to receive a transactional item responsive to a purchase, such as a coffee. By using the contactless card 101, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card 101 and the device, which may configured to process one or more tap gestures. As explained above, the one or more applications may be configured to validate identity of the user and then cause the user to act or respond to it, for example, via one or more tap gestures. In some examples, data for example, bonus points, loyalty points, reward points, healthcare information, etc., may be written back to the contactless card.

In some examples, the contactless card 101 may be tapped to a device, such as the mobile device 110. As explained above, identity of the user may be verified by the one or more applications which would then grant the user a desired benefit based on verification of the identity.

In some embodiments, an example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card 101 can selectively communicate information depending upon the recipient device. Once tapped, the contactless card 101 can recognize the device to which the tap is directed, and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the tap of the contactless card 101 is directed to a device running Apple's iOS® operating system, e.g., an iPhone, iPod, or iPad, the contactless card can recognize the iOS® operating system and transmit data appropriate data to communicate with this device. For example, the contactless card 101 can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card 101 can recognize the POS device and transmit only the information necessary for the action or transaction. For example, upon recognition of a POS device used to complete a commercial transaction, the contactless card 101 can communicate payment information necessary to complete the transaction under the EMV standard.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless card 101 may be tapped to a mobile device without having to open an application, to indicate a desire or intent to utilize one or more of reward points, loyalty points, coupons, offers, or the like to cover one or more purchases. Thus, an intention behind the purchase is provided.

In some examples, the one or more applications may be configured to determine that it was launched via one or more tap gestures of the contactless card 101, such that a launch occurred at 3:51 pm, that a transaction was processed or took place at 3:56 pm, in order to verify identity of the user.

In some examples, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the contactless card.

In some examples, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In some examples, individuals who have different financial institutions may possess contactless cards 101 to provide information to initiate one or more payment requests from the card-tapping individual.

In some examples, the present disclosure refers to a tap of the contactless card. However, it is understood that the present disclosure is not limited to a tap, and that the present disclosure includes other gestures (e.g., a wave or other movement of the card).

Figure 8:
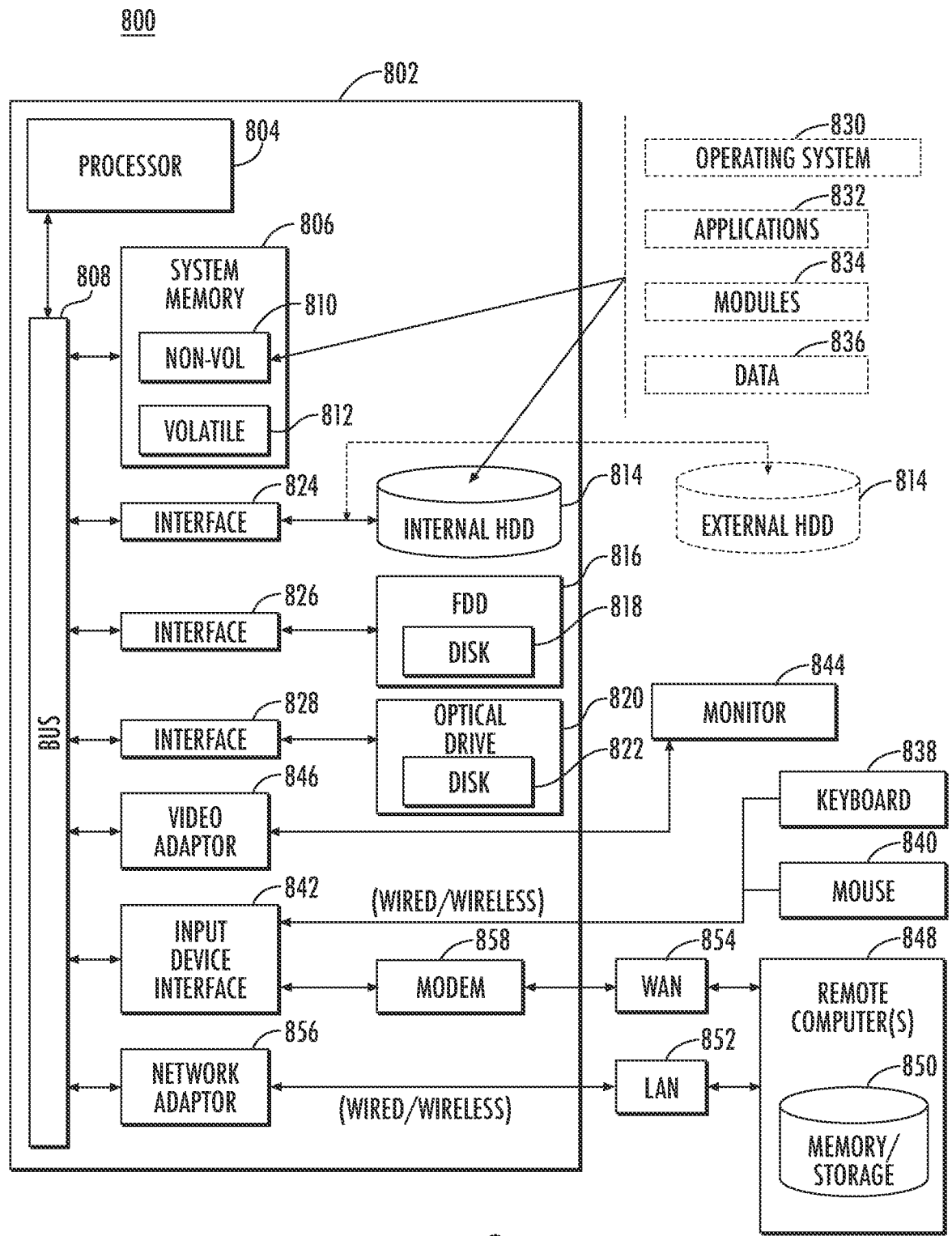
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the mobile devices 110 and server 120 of the system 100. The embodiments are not limited in this context. More generally, the computing architecture 800 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the operating system 112, account application 113, autofill service 114, other applications 115, clipboard 116, accessibility service 117, and the management application 123.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and BluetoothTM wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer-implemented method, comprising:
    determining, by an application executing on a processor of a device, that a payment field of a form has received focus based on a metadata attribute of the payment field;
    receiving, by the application, encrypted data from a contactless card;
    transmitting, by the application, the encrypted data to a server;
    determining, by the application based on a decryption result received from the server, that the server decrypted the encrypted data;
    receiving, by the application from the contactless card, an account number;
    providing, by the application, the account number to an autofill service of an operating system (OS) executing on the processor; and
    autofilling, by the autofill service, the account number to the payment field of the form based on another metadata attribute of the payment field indicating the payment field is associated with the account number.

2. The computer-implemented method of claim 1, wherein the account number received from the contactless card is encrypted, the method further comprising:
    decrypting the encrypted account number by the application prior to providing the account number to the autofill service.

3. The computer-implemented method of claim 1, wherein the account number is a first virtual account number received based on a first tap of the contactless card to the device, the method further comprising:
    receiving, by the application, a second virtual account number from the contactless card based on a second tap of the contactless card to the device;
    providing, by the application, the second virtual account number to the autofill service; and
    autofilling, by the autofill service, the second virtual account number to the payment field of the form.

4. The computer-implemented method of claim 1, wherein the account number is received based on a first tap of the contactless card to the device, the method further comprising:
    receiving, by the application based on a second tap of the contactless card to the device, an expiration date of the account number;
    providing, by the application, the expiration date to the autofill service;
    detecting, by the autofill service, an expiration date field of the form based on a metadata attribute of the expiration date field; and
    autofilling, by the autofill service based on the detection of the expiration date field, the expiration date to the expiration date field of the form.

5. The computer-implemented method of claim 1, wherein the account number is received based on a first tap of the contactless card to the device, the method further comprising:
    receiving, by the application from the contactless card based on the first tap, an expiration date of the account number and a card verification value (CVV) of the account number;
    providing, by the application, the expiration date and the CVV to the autofill service;
    detecting, by the autofill service, an expiration date field of the form and a CVV field of the form based on respective metadata attributes of the expiration date field and the CVV field; and autofill, by the autofill service based on the detection of the expiration date field and the CVV (i) the expiration date to the expiration date field of the form, and (ii) the CVV to the CVV field of the form.

6. The computer-implemented method of claim 1, wherein the account number received from the contactless card is one of a plurality of virtual account numbers stored by the contactless card.

7. A non-transitory computer-readable storage medium, the computer-readable storage medium including instructions that when executed by a processor of a device, cause the processor to:
- determine, by an application, that a payment field of a form has received focus;
- receive, by the application, encrypted data from a contactless card;
- transmit, by the application, the encrypted data to a server;
- determine, by the application based on a decryption result received from the server, that the server decrypted the encrypted data;
- receive, by the application from the contactless card, an account number;
- provide, by the application, the account number to an autofill service of an operating system (OS) executing on the processor; and
- autofill, by the autofill service, the account number to the payment field of the form based on another metadata attribute of the payment field indicating the payment field is associated with the account number.

8. The computer-readable storage medium of claim 7, wherein the account number received from the contactless card is encrypted, wherein the instructions further cause the processor to:
- decrypting the encrypted account number by the application prior to providing the account number to the autofill service.

9. The computer-readable storage medium of claim 7, wherein the account number is a first virtual account number received based on a first tap of the contactless card to the device, wherein the instructions further cause the processor to:
- receive, by the application, a second virtual account number from the contactless card based on a second tap of the contactless card to the device;
- provide, by the application, the second virtual account number to the autofill service; and
- autofill, by the autofill service, the second virtual account number to the payment field of the form.

10. The computer-readable storage medium of claim 7, wherein the account number is received based on a first tap of the contactless card to the device, wherein the instructions further cause the processor to:
- receive, by the application based on a second tap of the contactless card to the device, an expiration date of the account number;
- provide, by the application, the expiration date to the autofill service;
- detect, by the autofill service, an expiration date field of the form based on a metadata attribute of the expiration date field; and
- autofill, by the autofill service based on the detection of the expiration date field, the expiration date to the expiration date field of the form.

11. The computer-readable storage medium of claim 7, wherein the account number is received based on a first tap of the contactless card to the device, wherein the instructions further cause the processor to:
- receive, by the application from the contactless card based on the first tap, an expiration date of the account number and a card verification value (CVV) of the account number;
- provide, by the application, the expiration date and the CVV to the autofill service;
- detect, by the autofill service, an expiration date field of the form and a CVV field of the form based on respective metadata attributes of the expiration date field and the CVV field; and
- autofill, by the autofill service based on the detection of the expiration date field and the CVV (i) the expiration date to the expiration date field of the form, and (ii) the CVV to the CVV field of the form.

12. The computer-readable storage medium of claim 7, wherein the instructions further cause the processor to:
- determine, by the application, that an amount of time the account number has been stored by the autofill service exceeds a threshold amount of time; and
- delete, by the application, the account number from the autofill service based on the determination that the amount of time exceeds the threshold amount of time.

13. A computing apparatus comprising:
a processor; and
a memory storing instructions that, when executed by the processor, cause the processor to:
- determine, by an application, that a payment field of a form has received focus;
- receive, by the application, encrypted data from a contactless card;
- transmit, by the application, the encrypted data to a server;
- determine, by the application based on a decryption result received from the server, that the server decrypted the encrypted data;
- receive, by the application from the contactless card, an account number, an expiration date of the account number and a card verification value (CVV) of the account number;
- provide, by the application, the account number, the expiration date, and the CVV to an autofill service of an operating system (OS) executing on the processor;
- autofill, by the autofill service, the account number to the payment field of the form;
- detect, by the autofill service, an expiration date field of the form and a CVV field of the form based on respective metadata attributes of the expiration date field and the CVV field; and
- autofill, by the autofill service based on the detection of the expiration date field and the CVV field: (i) the expiration date to the expiration date field of the form, and (ii) the CVV to the CVV field of the form.

14. The computing apparatus of claim 13, wherein the account number received from the contactless card is encrypted, wherein the instructions further cause the processor to:
- decrypting the encrypted account number by the application prior to providing the account number to the autofill service.

15. The computing apparatus of claim 13, wherein the account number is a first virtual account number.

16. The computing apparatus of claim 13, wherein the account number is autofilled to the payment field based on another metadata attribute of the payment field indicating the payment field is associated with the account number.

17. The method of claim 1, further comprising:
receiving, by the application, an expiration date of the account number and a card verification value (CVV) of the account number;
providing, by the application, the expiration date and the CVV to the autofill service; and
autofilling, by the autofill service: (i) the expiration date to an expiration date field of the form, and (ii) the CVV to a CVV field of the form.

18. The computer-readable storage medium of claim 7, wherein the instructions further cause the processor to:
receive, by the application, an expiration date of the account number and a card verification value (CVV) of the account number;
provide, by the application, the expiration date and the CVV to the autofill service; and
autofill, by the autofill service: (i) the expiration date to an expiration date field of the form, and (ii) the CVV to a CVV field of the form.

19. The computer-readable storage medium of claim 7, wherein the account number is one of a plurality of virtual account numbers stored by the contactless card.

20. The computing apparatus of claim 13, wherein the account number, expiration date, and CVV are received based on one or more taps of the contactless card to the apparatus.

* * * * *

UNITED STATES PATENT AND TRADEMARK OFFICE
CERTIFICATE OF CORRECTION

PATENT NO. : 12,014,357 B2
APPLICATION NO. : 17/398724
DATED : June 18, 2024
INVENTOR(S) : Jeffrey Rule et al.

Page 1 of 1

It is certified that error appears in the above-identified patent and that said Letters Patent is hereby corrected as shown below:

In the Claims

Claim 5, Column 29, Line 2, after "the CVV" please add "field:".

Claim 11, Column 30, Line 15, after "the CVV" please add "field:".

Claim 15, Column 30, Line 65, after "account number is a" please remove "first".

Signed and Sealed this
Twenty-fourth Day of September, 2024

Katherine Kelly Vidal
*Director of the United States Patent and Trademark Office*